United States Patent [19]
Astley

[11] 3,872,348

[45] Mar. 18, 1975

[54] SPOT POSITIONING CONTROL FOR DISPLAY TUBES

[75] Inventor: Edward T. Astley, London, England

[73] Assignee: Crosfield Electronics Limited, London, England

[22] Filed: June 18, 1973

[21] Appl. No.: 370,642

[30] Foreign Application Priority Data
July 26, 1972 United Kingdom.............. 34979/72

[52] U.S. Cl.................. 315/10, 358/69, 315/367, 315/384
[51] Int. Cl. ........................................... H01j 29/70
[58] Field of Search .......... 250/217 CR; 178/5.4 R, 178/5.4 H, 5.4 R; 315/27 R, 10, 26, 25, 18

[56] References Cited
UNITED STATES PATENTS
2,604,534  7/1952  Graham .................... 315/27 R
3,562,409  2/1971  Freeman .................... 178/5.4 H
3,564,121  2/1971  Goodman .................... 178/5.4 F
3,717,729  2/1973  Van de Polder ............. 178/5.4 R Primary Examiner—Maynard R. Wilbur
Assistant Examiner—J. M. Potenza
Attorney, Agent, or Firm—Kemon, Palmer & Estabrook

[57] ABSTRACT

To deflect a light spot over a grating until it reaches a predetermined grating line, the beam is initially given a consistent starting point by deflecting it until its intersection with a grating line, or auxiliary line preceding the grating, is sensed and using the detection of this intersection to position the beam a fraction of the grating pitch away from the grating line; the beam is then deflected over the required integral multiple of the grating pitch, leaving the beam between two grating lines, and the beam is then progressively deflected until its intersection with the required grating line is detected.

17 Claims, 6 Drawing Figures

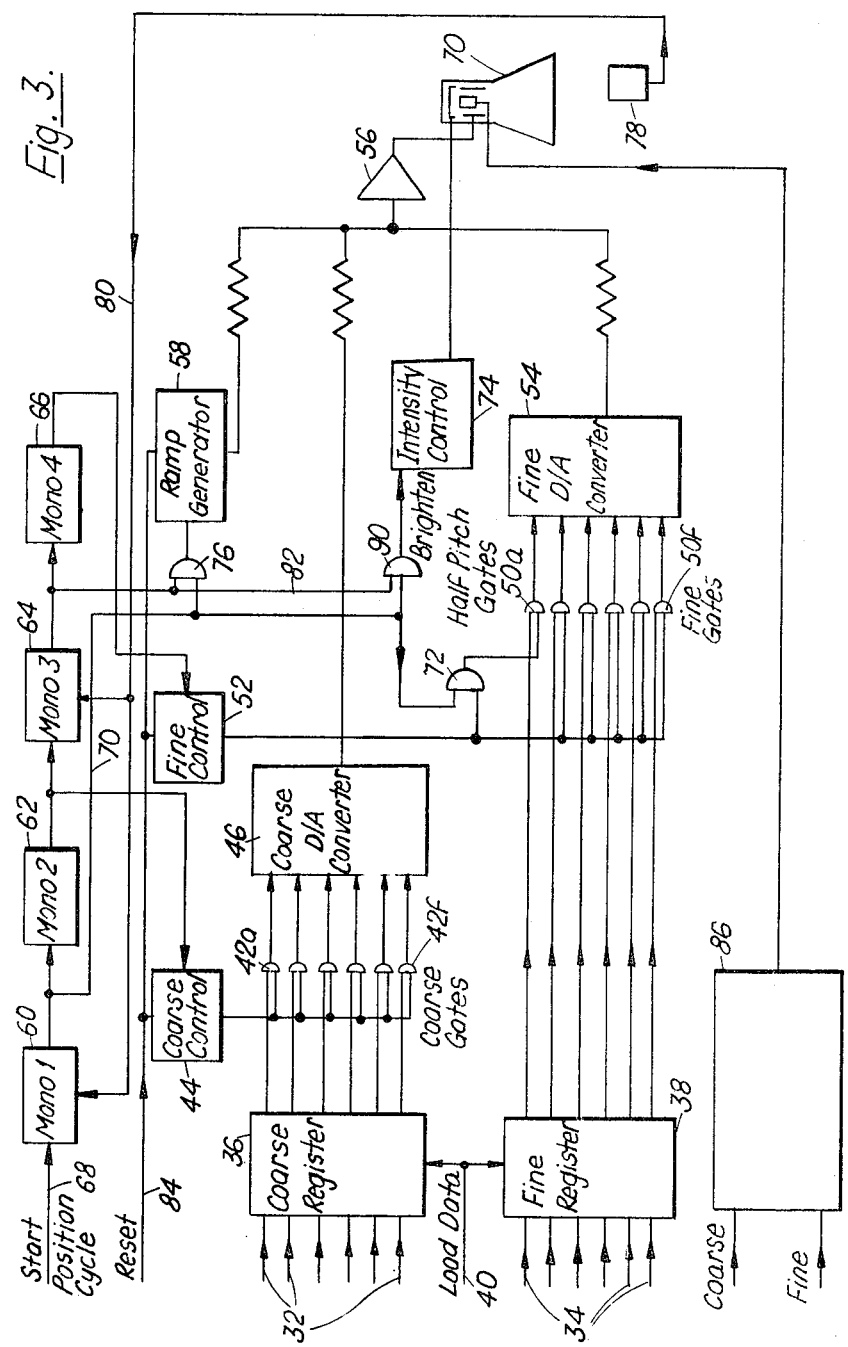

SPOT POSITIONING CONTROL FOR DISPLAY TUBES

This invention relates to a method and apparatus for positioning a light spot in a given position relative to a grating by sensing the intersection of the beam with lines of the grating. It can be used for example in a spot-positioning system for a display tube of the kind in which an electron beam can be angularly deflected to intersect different parts of a phosphor screen. A spot positioning system of this latter kind can be used, for example, with photo-composing machines in which it may be required to form on the screen of a cathode ray tube an image of a character to be exposed, in a position on the screen which will result in an image of the character being formed in a desired position on a photographic film exposed to the light from the cathode ray tube. In one previous proposal, we employed a grating of parallel lines positioned over a part of the cathode ray tube and we deflected the beam across these parallel lines, the changes in light intensity as the beam crossed the successive lines being counted and used to stop the beam deflection when it had achieved a desired position. The use of an optical grating reduces the complexity of the driving circuits for the cathode ray tube and improves the consistency with which the beam can attain a given position in repeated operation of the system. However, the decay times of phosphors suitable for film exposure are such that conventional counting techniques can only be used at rather low rates and this increases the overall cycle time for performing a specific operation in a photo-composing system.

A method according to the present invention includes: progressively deflecting the beam along a predetermined path from a position outside the grating area towards the grating; detecting the intersection of the beam with a first grating line or with an auxiliary line preceding the grating in the direction of travel of the beam and using such detection to position the beam at a point a fraction of the grating pitch, along the said path, from a grating line; applying to a beam-deflection system a signal such that the point of intersection of the beam with the grating is shifted by a required integral multiple of the grating pitch from its position before such adjustment; further progressively deflecting the beam along the said path; sensing the first intersection of the beam with a grating line; and stopping the said progressive beam deflection in response to the sensed intersection. Thus in one form of this method, the auxiliary line is spaced from the first grating line by the predetermined fraction of the grating pitch so that when the intersection of the beam with the auxiliary line is detected the initial progressive deflection of the beam is halted with the beam spaced from the first grating line by a predetermined fraction of the grating pitch (or, for example, by an amount equal to one grating pitch plus the predetermined fraction). However, it is not essential to use an auxiliary line and in an alternative form of the method according to the invention, the initial progressive deflection of the beam continues until the intersection of the beam with the first grating line is sensed, after which the beam is deflected along the same path (backwards or forwards) by an amount such as to displace the beam from the grating line by the predetermined fraction of the grating pitch. The predetermined fraction is preferably one half of a grating pitch.

To avoid having the beam brightened longer than necessary and to avoid unnecessary signals from the sensing device as the beam traverses the grating when its intersection with the grating is shifted by the integral multiple of the grating pitch, the beam may be blanked prior to this latter deflection and thereafter brightened before its subsequent progressive deflection.

The positioning of the beam on a grating line by the method described above may constitute only coarse positioning of the beam and may be followed by fine positioning of the beam between adjacent grating lines.

It will be appreciated that such a system can be used with a rather coarse grating (for example, a grating with a pitch of 5 mm.); the fine positioning system can be used to position the spot between grating lines. Any error in the deflection potentials due to the fine positioning system can generally be ignored. The grating may have a pitch of 5 mm., for example.

Apparatus for carrying the invention into effect may include a digital-to-analogue converter for providing a signal for application to the beam positioning system to shift the intersection of beam and grating through the said predetermined integral multiple of the grating pitch.

In order that the invention may be better understood, an example of a method embodying the invention and apparatus for carrying the method into effect will now be described with reference to the accompanying drawings, in which:

FIG. 3 is a block diagram of a circuit for carrying the invention into effect.

Figure 1A:
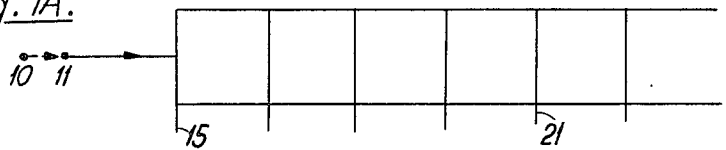
FIGS. 1A–1D show successive stages in the deflection of the beam across the grating.
Figure 2:
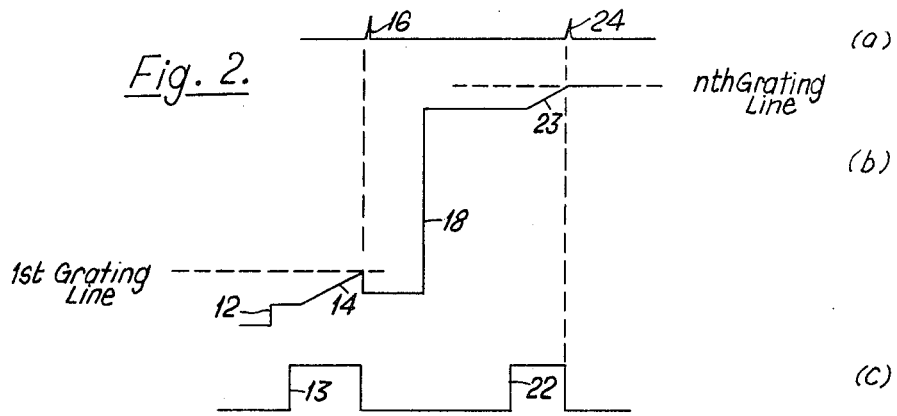
FIG. 2 is a waveform diagram illustrating control signals used to carry out the successive stages of FIG. 1.

Initially, the output of a beam control system is such that if the beam were brightened it would be at position 10 in FIG. 1A. In a system using the present invention, this initial position is not critical. It will be assumed that it is required to position the beam on grating line 21. When beam-positioning signals are received, a bias is applied to the beam deflection system such that when a brightening pulse is applied to the cathode ray tube the beam is located at position 11. The distance between positions 10 and 11 is equal to approximately one half of a grating pitch. This bias is represented by the step 12 in FIG. 2b, which is the effective deflecting signal for the beam, and the brightening pulse is indicated at 13 in FIG. 2c, which is a waveform of the brightening signal.

Figure 1B:
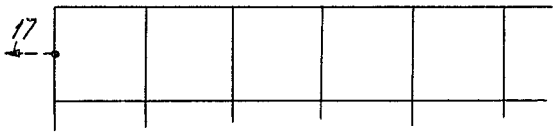

A ramp deflection waveform 14 (FIG. 2b) is now started and this causes the brightened spot to sweep towards the grating, as shown in FIG. 1A. When the spot reaches the first slit in the grating (represented by the line 15 in FIG. 1A), a pulse 16 (FIG. 2a) is generated by a photomultiplier. This pulse is used firstly to stop the deflection ramp 14, secondly to remove the deflection bias of one half of a grating pitch which was originally applied, and thirdly to remove the brightening pulse from the cathode ray tube. As a consequence, the position of the beam, if brightened, is now the position indicated at 17 in FIG. 1B. In this way, a consistent starting point for the subsequent deflection is obtained.

Figure 1C:
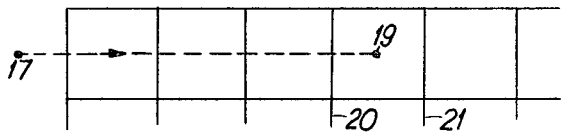

A fourth effect of the photo-multiplier pulse is to start a delay circuit and to gate into tolerance a digital-to-analogue converter receiving a signal representing the required deflection. The output of the digital-to-analogue prior converter is applied to the beam positioning system and has the effect of producing a step 18 (FIG. 2b) in the deflection waveform. The new position of the beam if brightened is shown at 19 in FIG. 1C and is displaced from its earlier position 17 by an integral multiple of the grating pitch (in this case four times the grating pitch). The position 19 is between two grating slits 20 and 21, the slit 21 representing the beam position required by the digital-to-analogue converter. At the end of the delay the beam is brightened by a brightening pulse 22 (FIG. 2c) and the ramp deflection waveform is restarted, as indicated at 23 in FIG. 2b. The brightened spot now moves on from position 19 (see FIG. 1D). When it reaches the next slit 21 the photo-multiplier generates a pulse 24 which is used to blank the spot and to stop the deflection waveform 23. The beam spot is now accurately positioned at the grating slit 21 required by the digital-to-analogue converter.

Such a system is faster than one in which grating pulses are counted and allows a wide wolerance on drift and stability of the deflection system. Drift of up to 80 percent of a grating pitch can be tolerated in the original position of the spot, priot to the application of the positioning signals, and when the spot is positioned by the output of the digital-to-analogue converter, deflection distortion may be up to ±40 percent of a grating pitch and yet the spot will still fall between the required pair of grating slits. The system described will also operate at a lower light intensity from the cathode ray tube than one in which grating pulses must be counted and this decreases any fogging of the recording medium which may take place.

In the block diagram shown in FIG. 3, the position (in one direction) of the beam on the screen of a cathode ray tube 30 is controlled by coarse digital signals applied to lines 32 and fine digital signals applied to lines 34. The coarse and fine signals are loaded into registers 36 and 38 respectively, under the control of a data-loading signal on line 40. During the operation the coarse signals are applied from the register 36 through gates 42 (under the control of a coarse control circuit 44) to a digital-to-analogue converter 46. In a similar manner, the fine signals are applied through gates 50, under the control of a fine circuit 52, to a digital-to-analogue converter 54. A deflection amplifier 56, which controls the signal applied to the tube deflection system, receives at its input the output of the converters 46 and 54 as well as the output of a ramp generator 58.

The timing of the cycle of events in the block diagram of FIG. 3 is controlled by four series-connected monostable circuits 60, 62, 64 and 66. The cycle is started by the application of a pulse to line 68. This causes operation of monostable 60. As a consequence a signal on line 70 acts through "half pitch" gates 72 and 50a to cause a half-pitch deflection bias signal to be present at the output of converter 54. The signal on line 70 is also applied to an intensity control circuit 74 which applies a brightening signal to the cathode of the tube 30. Finally, the signal on line 70 acts through gate 76 to start the operation of a ramp generator 58. In this way, the step 12 and ramp 14 of the deflection waveform (FIG. 2b) are generated. When the photo-multiplier 78 senses the arrival of the beam at the first grating slit, a signal is applied over line 80 to monostables 60 and 64. As monostable 60 is in its unstable state it is reset by this pulse. The pulse has no effect on monostable 64.

Due to monostable 60 resetting, its output via gates 76, 72 and 90 causes the ramp generator to stop at its existing level, blanks the beam of the tube and removes the half grating pitch offset.

The change in output signal from monostable 60 causes monostable 62 to switch to its unstable state. The signal from circuit 62 brings into operation the coarse control circuit 44 and thus transfers the coarse input signals through the gates 42a to 42f to the converter 46. Consequently the waveform step 18 (FIG. 2b) is applied from the converter 46 to the deflection amplifier 56 and the potential beam position (i.e., the position if the beam were brightened) is shifted from 17 to 19 in FIG. 1C.

The unstable state of monostable 62 is sufficiently long to allow the course deflection to take place. When monostable 62 returns to its stable state it causes monostable 64 to switch to its unstable state.

The output from monostable 64 is applied along line 82 to cause the intensity control circuit 74 to brighten the spot and also acts through gate 76 to restart the ramp generator 58. In this way, the deflection potential applied to the tube receives the ramp waveform 23 of FIG. 2b. Then, when a further pulse is receives from the photo-multiplier 78, the resulting signal on line 80 resets monostable 64, which stops the ramp generator 58 and again actuates the intensity control circuit 74 to blank the spot.

Figure 1D:
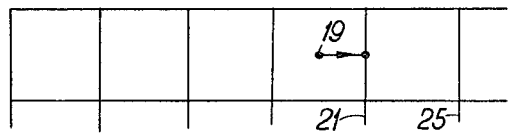

The spot is now positioned on line 21 of FIG. 1D.

The return of monostable 64 to its stable state causes monostable 66 to switch to its unstable state and produce an output signal. This energises the fine control circuit 52 with the result that the fine input signals from lines 34 are applied through gates 50a –50f to the converter 54 and the deflection amplifier 56 is given a signal which causes the beam to move from line 21 of FIG. 1D towards line 25 by a required portion of the grating pitch, this portion being determined by the fine signals on lines 34.

As the grating pitch is small compared to the width of the tube screen, inaccuracies in the fine converter 54 are so small as to be of little consequence in practice. Thus, with a grating pitch of 5 mm. and a converter of 1 percent tolerance, the maximum error is 0.05 mm.

The system can be reset, when required, by a pulse on line 84.

It will be appreciated that the circuits described control the deflection of the beam in one direction only. Deflection in a direction perpendicular to this first direction can be controlled by a circuit 86 containing all the circuits 36–76 described in connection with deflection in the first direction.

Although in the apparatus described above provision is made for blanking the beam, it will be appreciated that this is not essential. For example, a gate circuit could be arranged to block the signal from the photo-multiplier in the intervals in which, in the above described operation, the beam is blanked.

Furthermore, although in the example described above the light spot results from the intersection of an electron beam with the phosphor screen of a cathode ray tube, the invention can be applied to other forms of light-spot positioning systems. For example, it could be applied to the positioning of the light spot produced by a mirror galvanometer.

I claim:

1. A method of deflecting a beam to position a light spot in a given position relative to a grating by sensing the intersection of the beam with lines of the grating, comprising:

progressively deflecting the beam along a predetermined path from a position outside the grating area towards the grating;

detecting the intersection of the beam with a first grating line or with an auxiliary line preceding the grating in the direction of travel of the beam and using such detection to position the beam at a point at least a fraction of the grating pitch, along the said path, from a grating line;

applying to a beam deflection system a signal such that the point of intersection of the beam with the grating is shifted by a required integral multiple of the grating pitch from its position before such adjustment;

further progressively deflecting the beam along the said path;

sensing the first intersection of the beam with a grating line;

and stopping the said progressive beam deflection in response to the sensed intersection.

2. A method as defined in claim 1, in which the beam is an electron beam in a cathode ray tube and the grating extends over a part of the cathode ray tube screen.

3. A method in accordance with claim 1, in which the auxiliary line is spaced from the first grating line by at least the predetermined fraction of the grating pitch, and in which the initial progressive deflection of the beam continues until the intersection of the beam with the said auxiliary line is sensed, whereupon the progressive beam deflection is stopped and the deflection of the beam to shift its intersection with the grating by the integral multiple of the grating pitch takes place.

4. A method in accordance with claim 1, in which the initial progressive deflection of the beam continues from the beam position outside the main grating area until sensing of the intersection of the beam with the first grating line takes place, and in which the beam is thereupon deflected along the same path, backwards or forwards, by an amount such as to displace the beam from a grating line by the predetermined fraction of the grating pitch, the beam being then deflected through the integral multiple of the grating pitch.

5. A method in accordance with claim 1, including means operative when the said further progressive deflection of the beam has been stopped to deflect the beam by a required portion of a grating pitch to provide fine positioning of the beam between the grating lines.

6. A method in accordance with claim 1, including blanking the beam prior to its deflection to shift its intersection with the grating by a required integral multiple of the grating pitch and brightening the beam prior to the subsequent progressive deflection of the beam to permit its intersection with a grating line to be sensed.

7. A light-spot positioning system in which a beam is angularly deflected to cause a light spot to traverse a grating of parallel lines, the system comprising:

beam-deflecting means for progressively deflecting a beam in a required direction to progressively displace the point of intersection of the beam with the grating;

first beam-positioning means for adjusting the beam position, in the said direction, by an amount such that the beam intersection with the grating moves through a fraction of a grating pitch;

second beam-positioning means for positioning the beam so as to displace its point of intersection with the grating in the desired direction through a distance equal to an integral multiple of the grating pitch;

detecting means for sensing the intersection of the beam with a grating line;

and sequencing means whereby initially the beam is positioned at least a predetermined fraction of the grating pitch from a grating line, by progressive deflection of the beam by the beam-deflecting means until the detecting means senses the intersection of the beam with an auxiliary line preceding the grating in the direction of travel of the beam and spaced therefrom by said predetermined fraction of the grating pitch, after which the second beam-positioning means adjusts the beam position in the said direction by a predetermined integral multiple of the grating pitch, and thereafter the beam-deflecting means progressively deflects the beam until stopped by the action of the detector means on sensing the next intersection of the beam with a grating line.

8. A system as defined in claim 7, in which the grating is formed on the screen of a cathode ray tube and the beam is an electron beam within the cathode ray tube which traverses the grating during deflection of the beam.

9. A system in accordance with claim 8, in which the second beam positioning means includes a digital-to-analogue converter.

10. A system in accordance with claim 7, further including an intensity control means for brightening and blanking the said beam, the sequencing means being such that the intensity control means blanks the beam prior to the adjustment of the beam position by the second beam-positioning means and thereafter brightens the beam prior to its progressive deflection by the beam-deflecting means.

11. A system in accordance with claim 7, for providing coarse positioning of the beam over the tube surface, further including a fine beam-position control circuit for positioning the beam between two grating lines, the sequencing means acting to bring the fine positioning circuit into operation when the detecting means senses the intersection of the beam with a grating line at the end of the coarse positioning of the beam.

12. A light-spot positioning system in which a beam is angularly deflected to cause a light spot to traverse a grating of parallel lines, the system comprising:

beam-deflecting means for progressively deflecting a beam in a required direction to progressively displace the point of intersection of the beam with the grating;

first beam-positioning means for adjusting the beam position, in the said direction, by an amount such that the beam intersection with the grating moves through a fraction of a grating pitch;

second beam-positioning means for positioning the beam so as to displace its point of intersection with the grating in the desired direction through a distance equal to an integral multiple of the grating pitch;

detecting means for sensing the intersection of the beam with a grating line;

and sequencing means whereby initially the beam is progressively deflected by the beam-deflecting means until the detecting means senses the intersection of the beam with a first grating line and the beam is then positioned a predetermined fraction of the grating pitch from the grating line, after which the second beam-positioning means adjusts the beam position in the said direction by a predetermined integral multiple of the grating pitch, and thereafter the beam-deflecting means progressively deflects the beam until stopped by the action of the detector means on sensing the next intersection of the beam with a grating line.

13. A system as defined in claim 12 in which the grating is formed on the screen of a cathode ray tube and the beam is an electron beam within the cathode ray tube which traverses the grating during deflection of the beam.

14. A system in accordance with claim 13, in which the second beam positioning means includes a digital-to-analogue converter.

15. A system in accordance with claim 12, further including an intensity control means for brightening and blanking the said beam, the sequencing means being such that the intensity control means blanks the beam prior to the adjustment of the beam position by the second beam-positioning means and thereafter brightens the beam prior to its progressive deflection by the beam-deflecting means.

16. A system in accordance with claim 12, for providing coarse positioning of the beam over the tube surface, further including a fine beam-position control circuit for positioning the beam between two grating lines, the sequencing means acting to bring the fine positioning circuit into operation when the detecting means senses the intersection of the beam with a grating line at the end of the coarse positioning of the beam.

17. A system in accordance with claim 13, including means for initially applying to the beam position a bias of an amount corresponding to a beam deflection at the screen of a predetermined fraction of the grating pitch, the apparatus including means for removing this bias when the detecting means indicates that it has sensed the intersection of the beam with the first grating line.

* * * * *